2,893,910

TOXIC REACTION PRODUCTS OF ORGANOSULFINYLAMINES WITH DIALKYL PHOSPHITES

Gail H. Birum and Samuel Allen Heininger, Dayton, Ohio, assignors to Monsanto Chemical Company, St. Louis, Mo., a corporation of Delaware No Drawing. Application March 29, 1957
Serial No. 649,293

19 Claims. (Cl. 167—22)

This invention relates to a method of reacting organosulfinylamines, sometimes called organothionylamines, with dialkyl phosphites and to the reaction products thereof. The invention further relates to the formulation of these novel reaction products into parasiticidal compositions and to the application of these novel reaction products to the killing of parasites.

By the invention, a method is provided for reacting organosulfinylamines with dialkyl phosphites in the presence of a catalyst taken from the class consisting of alkali metals and lower-alkoxide compounds thereof to produce new and useful reaction products. It is believed that the reaction proceeds as follows:

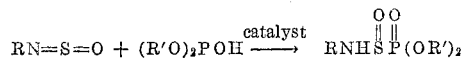

R is preferably a radical selected from the class consisting of alkyl, aralkyl, substituted-aralkyl, aryl and substituted-aryl having from 1 to 20 carbon atoms and wherein the aryl substituents are selected from the class consisting of halo and lower alkyl; and R′ is preferably lower alkyl. Since the structure of the new compounds of the invention is not definitely known, although it is believed to be as shown above, it will be necessary to claim these compounds by the method of making them.

It is an object of this invention to provide a new method of making reaction products of organosulfinylamines and dialkyl phosphites by reaction in the presence of an alkali metal catalyst or lower alkoxy derivative thereof to produce new and useful reaction products.

It is another object of this invention to provide new compounds useful as parasiticidal toxicants which compounds are the reaction products of organosulfinylamines and dialkyl phosphites.

It is a further object of this invention to provide parasiticidal formulations having the new reaction products therein as active ingredients.

It is still another object of this invention to provide a new method of killing parasites, wherein these new reaction products are applied to the host containing the parasites.

These and other objects of the invention will become apparent as the detailed description of the invention proceeds.

The organosulfinylamines used in the method of the invention can be made by reacting a primary amine with thionyl chloride as shown in the following equation:

wherein R is an organo radical as defined herein above. However, it should be understood that the invention is not limited to the above preferred organic radicals for R. It will be obvious in view of the teachings of the invention that other substituted-alkyl, substituted-aryl or substituted-aralkyl sulfinylamines are useable in the novel reaction, provided the substituents do not enter into or hinder the reaction.

The dialkyl phosphites useable in the new method of the invention are well known and can be prepared by well known methods. Reference is particularly made to the book "Organo-Phosphorus Compounds" by Kosolapoff, pages 182, 202 and 203. These phosphites can be made by a method shown in the following equation:

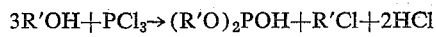

wherein R′ is preferably a lower-alkyl radical, i.e., having not more than 6 carbon atoms. A variety of these are specifically named on pages 202 and 203 of Kosolapoff. The longer chain dialkyl phosphites, i.e., the ones having about 20 or more carbon atoms per R′ group, will be more sluggish in their reaction with the organosulfinylamines, so the lower molecular weight dialkyl phosphites are preferred since faster reaction and higher yields of the desired products will result. Although preferred phosphites have been indicated above, the invention is not limited to the use of these particular phosphites since aryl or substituted-aryl and substituted-alkyl phosphites will also react in like manner with organosulfinylamines, provided that the substituents do not enter into or hinder the reaction.

It has been indicated that the alkali metals, i.e., sodium, potassium, lithium, rubidium and cesium are suitable catalysts for the new method; and also that the lower-alkoxide derivatives of the alkali metals are also suitable catalysts. Lower-alkoxide is defined as having not more than 6 carbon atoms per molecule, e.g., sodium methoxide, sodium ethoxide, sodium n-propoxide, sodium iso-propoxide, sodium n-butoxide, sodium t-butoxide, sodium n-pentoxide, sodium n-hexoxide, lithium methoxide, lithium ethoxide, lithium n-butoxide, rubidium methoxide, cesium ethoxide, potassium methoxide, etc. Of the alkoxide catalysts the methoxide and ethoxide catalysts are preferred. While the catalysts listed above are suitable, it is believed that the alkali metal hydrides, e.g., sodium hydride, etc. will also be suitable as catalysts in our new reaction.

The reaction will proceed at ambient temperatures, i.e., about 20–25° C., as indicated by the examples hereafter given, and at atmospheric pressure. With some reactants it may be more desirable to conduct the reaction at superatmospheric pressure or even under vacuum, or at lower than or higher than ambient temperature for maximum yields. Benzene, toluene, or similar solvents can be used in the reaction and are preferably used, but a solvent is not required.

A number of specific reaction products of the invention are shown below. It is not intended that this be a complete listing of all the possible reaction products but merely to be illustrative thereof. For example, illustrative of the alkylsulfinylamine and dialkyl phosphite reaction products are: methylsulfinylamine and diethyl phosphite, ethylsulfinylamine and dimethyl phosphite, n-propylsulfinylamine and diisopropyl phosphite, n-butylsulfinylamine and di-iso-butyl phosphite, t-butylsulfinylamine and di-n-amyl phosphite, n-hexylsulfinylamine and di-n-hexyl phosphite, n-octylsulfinylamine and diethyl phosphite, n-nonylsulfinylamine and dimethyl phosphite, n-decylsulfinylamine and dimethyl phosphite, n-hexadecylsulfinylamine and diethyl phosphite, n-eicosylsulfinylamine and dimethyl phosphite, etc.

Illustrative of the aralkylsulfinylamine and dialkyl phosphite reaction products are the following: benzylsulfinylamine and diethyl phosphite, α-naphthylmethylsulfinylamine and diisopropyl phosphite, p-diphenylmethylsulfinylamine and dimethylphosphite, etc.

The following is illustrative of the substituted-aralkylsulfinylamine and dialkyl phosphite reaction products: p-chlorobenzylsulfinylamine and di-n-amyl phosphite, etc.

Illustrative of the arylsulfinylamines and dialkyl phosphite reaction products are the following examples: sulfinylaniline and dimethyl phosphite, α-naphthylsulfinylamine and diethyl phosphite, β-naphthylsulfinylamine and dimethyl phosphite, p-diphenylsulfinylamine and di-n-propyl phosphite, etc.

Illustrative of the substituted-arylsulfinylamine and dialkyl phosphite reaction products are: 2-chlorosulfinylaniline and dimethyl phosphite, 3-chlorosulfinylaniline and diethyl phosphite, 4-chlorosulfinylaniline and dimethyl phosphite, 2,4-dichlorosulfinylaniline and diethyl phosphite, pentachlorosulfinylaniline and diethyl phosphite, p-bromosulfinylaniline and diethyl phosphite, m-bromosulfinylaniline and diethyl phosphite, o-chloro-p-bromosulfinylaniline and dimethyl phosphite, p-iodosulfinylaniline and dimethyl phosphite, o-iodo-m-chlorosulfinylaniline and diethyl phosphite, o-fluorosulfinylaniline and dimethyl phosphite, 2,3,4-trifluorosulfinylaniline and diethyl phosphite, o-fluoro-p-bromosulfinylaniline and di-n-butyl phosphite, o-methylsulfinylaniline and dimethyl phosphite, 2,4-diethylsulfinylaniline and dimethyl phosphite, o-(n-hexyl)sulfinylaniline and diethyl phosphite, pentamethylsulfinylaniline and diethyl phosphite, β-chloronaphthyl-α-sulfinylamine and dimethyl phosphite, etc.

The branched-chain alkyls having carbon chain lengths longer than 4 are also intended to be covered, although they are not specifically named in the above listing, as well as many other compounds not named but falling within the broad definition of the invention.

The invention will be more clearly understood from the following detailed description of specific examples thereof.

*Example 1*

This is an example of the reaction product of t-butylsulfinylamine and diethyl phosphite.

A 3-liter flask was charged with 439.2 g. (6.0 moles) of t-butylamine and 1 pound of anhydrous ether. The mixture in the flask was cooled to 5° C., and a cooled solution of 238 g. (2.0 moles) of thionyl chloride in 1 pound of anhydrous ether was added dropwise to the flask. The temperature was kept below 20° C. by cooling during the dropwise addition. A white precipitate formed immediately. After all the thionyl chloride was added, the reaction mixture was allowed to stand for 1 hour, after which time the white solid was filtered from the reaction mixture. The filtered material was washed with ethyl ether. Then the washings and the filtrate were combined, and distilled, removing the ether first, then collecting 112 g. of colorless t-butylsulfinylamine boiling at atmospheric pressure at 97° C. An elemental analysis of the product gave the following information:

|  | Found | Calculated as $C_4H_9NOS$ |
| --- | --- | --- |
| Percent C | 41.2 | 40.4 |
| Percent H | 7.97 | 7.57 |
| Percent N | 11.14 | 11.75 |
| Percent S | 25.25 | 26.9 |

In a flask were placed 150 ml. of benzene, 35.8 g. (0.3 mole) of the t-butylsulfinylamine prepared above, and 41.4 g. (0.3 mole) of freshly distilled diethyl phosphite. The addition of 0.5 g. of anhydrous sodium acetate caused no temperature rise in the mixture; however, when 0.5 g. of sodium was added, the temperature immediately started to rise and reached a maximum of 54° C. The reaction mixture was refluxed at 87° C. for ½ hour. No acidic fumes were evolved during this refluxing. Then the reaction mixture was allowed to cool and to stand overnight during which time a small amount of white, gelatinous material separated. The clear, almost colorless benzene solution was decanted and most of the benzene was removed by distillation at water aspirator pressure. The residue remaining in the flask was filtered and then concentrated to a pot temperature of 94° C./0.4 mm. Pressure increase above about 90° C. indicated decomposition so the yellow liquid residue was cooled to prevent further decomposition. The residue weighed 62.3 g. (81% of theory), $n_D^{25}$ 1.4459. An elementary analysis showed the product to have approximately the composition $C_8H_{20}NO_4PS$.

*Example 2*

This is an example of the reaction product of t-dodecylsulfinylamine and diethyl phosphite.

The t-dodecylsulfinylamine used in this example was produced as follows: In a flask 185 g. (1.0 mole) of t-dodecylamine was mixed with 158 g. (2.0 mole) of pyridine in 300 ml. of benzene. To the mixture in the flask 119 g. (1.0 mole) of thionyl chloride was added slowly with stirring. The reaction was quite exothermic and the temperature gradually increased to 70° C. A solid started to form when about ⅓ of the thionyl chloride had been added. No acidic vapor was evolved from the condenser. The temperature was maintained at 70° C. during the addition of the thionyl chloride which addition took place over the period of 1 hour. An additional 300 ml. of benzene was added to the flask to facilitate stirring. When an acidic vapor began to be evolved the heat source was removed from the flask and the contents were allowed to stand overnight. The reaction mixture was then filtered to remove the solid therefrom. In the distillation of the filtrate, some trouble was encountered with subliming solids and the material was redistilled to give 205 g., B.P. 129–139° C./20 mm., $n_D^{25}$ 1.4597. This represents an 89% yield of t-dodecylsulfinylamine.

In a flask were placed 150 ml. of benzene, 34.5 g. (0.25 mole) of diethyl phosphite, and 57.9 (0.25 mole) of the t-dodecylsulfinylamine just prepared. There was no reaction until 1.0 g. of sodium was added at which time the temperature increased spontaneously to 73° C. The reaction mixture was then warmed to maintain the temperature at 70° C. for ½ hour. The sodium was all dissolved so 0.5 g. more was added and the warming continued at 70–85° C. for about ⅓ hour. Then the reaction mixture was allowed to cool and stand overnight. Concentration of the reaction mixture to a pot temperature of 107° C./0.2 mm. gave 67.0 g. of amber liquid residue, $n_D^{25}$ 1.4585. A sample of this residue submitted for elemental analysis indicated it to have approximately the composition of $C_{16}H_{36}NO_4PS$.

*Example 3*

This is an example of the reaction product of sulfinylaniline and diethyl phosphite.

The sulfinylaniline was made as follows: In a 3-liter flask were placed 465 g. (5.0 moles) of aniline and 750 ml. of dry benzene. Over a period of about ½ hour a total of 590 g. (5.0 moles) of thionyl chloride was added to the flask through the condenser attached thereto. A vigorous reaction occurred, causing the contents of the flask to be heated to benzene reflux temperature, and a yellow precipitate of aniline hydrochloride settled out. Manual shaking was used to prevent build-up of an excess of thionyl chloride, and heating at reflux temperature was then continued overnight (for 18 hours) with evolution of hydrogen chloride. The next morning most of the solid had gone into solution; however, the liquid was very dask. The benzene was stripped off under reduced pressure and the residue filtered to remove a solid material which was presumably unreacted aniline hydrochloride. The filtrate was distilled, giving 495 g. (71.5% yield) of orange liquid, B.P. 89–90° C./23 mm.

A sample of 69.6 g. (0.5 mole) of the sulfinylaniline was added to a flask with 200 ml. of toluene and 89.7 g. (0.65 mole) of freshly distilled diethyl phosphite. No reaction occurred until 1 g. of sodium was added to the contents of the flask. The temperature immediately began to rise upon the sodium addition and reached a maximum temperature of 87° C. without external warming. No fumes were produced with ammonia at the top of the condenser at this temperature. When external heating was applied, another exothermic reaction seemed to be initiated above 95° C. and acidic vapors were evolved. The temperature increased rapidly to 104° C. The reaction mixture was then cooled to room temperature and filtered to remove about 2 g. of gelatinous, water-soluble precipitate. The filtrate was concentrated to a pot temperature of 94° C./0.1 mm. to give 122.9 g. of red liquid residue, $n_D^{25}$ 1.4916. An elemental analysis of the residue indicated it to have approximately the composition $C_{10}H_{16}NO_4PS$.

Example 4

This is an example of the reaction product of o-chlorosulfinylaniline and diethyl phosphite.

The o-chlorosulfinylaniline was prepared as follows: In a 5-liter flask, 1557 g. (12.2 moles) of o-chloroaniline and 1700 ml. of benzene were placed. Thionyl chloride (1450 g., 12.2 moles) was slowly added with stirring. A vigorous reaction took place and the aniline hydrochloride precipitated, eventually causing the entire mass to be solidified except around the stirrer. As a result of the exothermic nature of the reaction, benzene reflux temperature was reached. After all the thionyl chloride was in, heating was continued with the result that the solids gradually dissolved until a slurry was formed. Heating and stirring was continued for 5 hours; then the reaction mixture was allowed to cool and stand overnight. The next day heating was continued at reflux temperature, and after 1 hour an additional 50 ml. of thionyl chloride was added. Reflux was continued for an additional 2 hours with the result that complete solution of all the material was obtained, leaving no residue in the flask. The benzene was distilled from the reaction mixture under vacuum. Then the product was distilled, B.P. 76–80° C./0.5–0.6 mm., $n_D^{25}$ 1.6396, yellow liquid, weight 2045 g. (96.6% yield).

Benzene (150 ml.), 52.2 g. (0.3 mole) of the o-chlorosulfinylaniline prepared above, and 41.4 g. (0.3 mole) of diethyl phosphite were placed in a flask and stirred. No reaction occurred until 1.0 g. of sodium was added. The temperature increased spontaneously to 78° C. at which point cooling was used to prevent further rise. The flask and contents were then warmed at 70–72° C. for about ½ hour. There was a small amount of unreacted sodium. Some filter aid was stirred into the reaction mixture as it cooled to room temperature, and it was filtered and washed with benzene. Distillation of benzene and a low-boiling product, 18.8 g., B.P. 60–78° C./0.05–0.1 mm. left 63.0 g. of an amber liquid residue, $n_D^{25}$ 1.5138. An elemental analysis of the residue gave the following information:

|           | Found | Calculated as $C_{10}H_{15}ClNO_4PS$ |
|-----------|-------|--------------------------------------|
| Percent N | 4.11  | 4.5                                  |
| Percent P | 10.26 | 10.0                                 |
| Percent S | 8.05  | 10.3                                 |

Example 5

This is an example of the preparation of the reaction product of p-chlorosulfinylaniline and dimethyl phosphite.

The p-chlorosulfinylaniline was prepared as follows: In a 2-liter flask fitted with a condenser were placed 510 g. (4.0 moles) of p-chloroaniline and 500 ml. of benzene, and then 476 g. (4.0 moles) of thionyl chloride was added to the flask. The flask and contents were heated until boiling began with the evolution of HCl. A solid layer remained on the bottom of the flask and did not mix with the layer above it, so 250 ml. more of benzene was added to the flask, and heating was continued in an attempt to solubilize the material in the bottom of the flask. After 18 hours of reflux, a dark solution resulted, but there remained a big lump of black or purple solid—insoluble in the benzene solution—in the bottom of the flask. The liquid was decanted and distilled—stripping off the benzene first—then collecting 510 g. of the yellow p-chlorosulfinylaniline which solidified readily at room temperature, B.P. 108–109° C./15 mm., 73.4% yield.

A sample of 69.5 g. (0.4 mole) of the p-chlorosulfinylaniline prepared above was added to a flask containing 200 ml. of benzene and 49.5 g. (0.45 mole) of freshly distilled dimethyl phosphite. There was no indication of reaction until about 0.2 g. of sodium was added. The temperature in the flask increased to 35° C., and then dropped. About 0.1 g. more of sodium caused the temperature to increase to 35° C. again, and 0.2 g. more of sodium caused the temperature to increase to 52° C. Not all of the sodium from the last addition dissolved until the mixture was warmed to 60° C. The addition of 0.2 g. more sodium resulted in further temperature increase to 72° C. but much of an additional 0.2 g. of sodium remained unreacted after the mixture was warmed at 70–72° C. for ½ hour. About 3 g. of acetic acid was added to the reaction mixture. After standing overnight, the reaction mixture was filtered to remove some water-soluble solid. The filtrate was then concentrated to a pot temperature of 92° C./0.1 mm., at which point the pressure started increasing, indicating decomposition. There remained in the flask 116.3 g. of red liquid residue, $n_D^{25}$ 1.5410. A sample of this residue was submitted for elemental analysis. It showed an approximate composition of $C_8H_{11}ClNO_4PS$.

Example 6

This is an example of the preparation of the reaction product of p-chlorosulfinylaniline and diethyl phosphite.

A sample of 69.4 g. (0.04 mole) of the p-chlorosulfinylaniline prepared in Example 5 was placed in a flask and to it was added 200 ml. of benzene and 55.2 g. (0.4 mole) of freshly distilled diethyl phosphite. About 0.2 g. of sodium was also placed in the flask. The temperature increased to 54° C., then started to drop. About 0.2 g. more of sodium was added and the temperature increased spontaneously to 72° C., when cooling was applied to prevent further temperature rise. The temperature started dropping before all the sodium had dissolved, so external warming was used to keep the temperature at 70° C. About 0.4 g. more of sodium was added and again the temperature increased, and cooling was used to keep the temperature at 70–72° C. During continued warming at 70° C. for 1½ hours, all of the sodium did not dissolve. The reaction mixture was allowed to cool and stand over the weekend, then 5.0 g. of acetic acid and a small amount of filter aid were added to the reaction mixture. The contents of the flask were then stirred and filtered. The filtrate was concentrated by heating at water aspirator pressure to 40° C. The residue was filtered and the filtrate concentrated by distillation to a pot temperature of 75° C./0.4 mm., at which point a pressure increase indicated decomposition. A red liquid residue of 121.3 g. (97% yield), $n_D^{25}$ 1.5222, remained in the flask. After the red liquid had stood for several days a small amount of yellow solid separated. A sample of the red liquid was decanted and submitted for elemental analysis which showed an approximate composition of $C_{14}H_{15}ClNO_4PS$.

Example 7

This is an example of the preparation of the reaction product of 2,4-dichlorosulfinylaniline and diethyl phosphite.

The dichlorosulfinylaniline was prepared as follows: A sample of 185 g. (1.14 moles) of 2,4-dichloroaniline was placed in a 1-liter flask and to this was added 400 ml. of dry benzene. Then 136 g. (1.14 moles) of thionyl chloride was added cautiously to the flask. The reaction was exothermic and a yellow solid precipitated. The contents of the flask were heated to reflux, resulting in the evolution of HCl, and the refluxing was continued for 6 hours until no more HCl was evolved. The contents of the flask were now clear dark red with no evidence of solids therein. The flask and contents were allowed to cool and stand overnight. The next morning some of the benzene was distilled off until solid formation began in the flask. Then the flask and contents were chilled and the yellow solid therein was removed by filtration. The filtrate was successively concentrated by distillation and filtration to get a number of batches of long yellow needles, M.P. 66–68° C., until a total of 200 g. had been obtained. This represents a yield of 84.5%. Elementary analysis of the solid gave the following results:

|         | Found | Calculated as $C_6H_3Cl_2NOS$ |
|---------|-------|-------------------------------|
| Percent C | 35.41 | 34.60 |
| Percent H | 1.54  | 1.44  |
| Percent N | 7.67  | 6.73  |
| Percent S | 13.29 | 15.40 |
| Percent Cl | 33.75 | 34.10 |

A sample of 31.2 g. (0.15 mole) of the 2,4-dichlorosulfinylaniline prepared above was placed in a 500 ml. flask with 100 ml. of toluene, and 27.6 g. (0.2 mole) of distilled diethyl phosphite was added over a period of about 6 minutes at 18° C. without any indication of reaction. The solution darkened slightly when it was warmed at 108–113° C. for 1½ hours, but there was no other indication of reaction so it was cooled to 50° C. and about 1 g. of sodium was added. The sodium reacted when the mixture was warmed to reflux. Refluxing was continued for about 1½ hours, then the reaction mixture was cooled, washed twice with water, and concentrated to a pot temperature of 94° C./1 mm. to give 40.5 g. of residue compared with a theoretical yield of 51.8 g. The product contained a small amount of yellow solid. A small amount of the clear liquor was submitted for elemental analysis which indicated an approximate composition of $C_{10}H_{14}Cl_2NO_4PS$.

Some of the reaction products produced in the above examples were tested for various parasiticidal uses. The results of these tests will be discussed in detail below.

The t-butylsulfinylamine and diethyl phosphite reaction product showed biological activity in giving 100% kill of the mobile and resting stages of the two-spotted spider mite, *Tetranychus telarius*, at concentrations as low as 0.1%, and also showed activity against the eggs and residual activity. The test was carried out by dipping infested lima bean plant leaves in aqueous emulsions or dispersions of the active ingredients. In contact testing of the reaction product, activity was demonstrated against nymphs of the large milkweed bug, *Oncopeltus fasiciatus*, at concentrations as low as 0.13%. Residual action was demonstrated by this reaction product against large milkweed bug nymphs at concentrations as low as 0.25% and against the Mexican bean beetle larvae, *Epilachna verivestis*, at 0.1% concentration. High systemic action was also demonstrated against the two-spotted spider mite (mobile stages) by dipping the excised stems in a solution of the chemical at concentrations as low as 0.004%. Further testing of the reaction product showed nematocidal activity at concentrations as low as 0.01%.

The sulfinylaniline and diethyl phosphite reaction product showed biocidal activity as follows: Contact activity was demonstrated against the two-spotted spider mite in testing on dipped bean plant leaves wherein activity was shown against the mobile stages and resting stages at concentrations as low as 0.1%. Contact activity was shown in tests against the yellow fever mosquito larvae, *Aedes aegypti*, at concentrations as low as 0.6 p.p.m. and against the large milkweed bug nymph at concentrations as low as 0.25%. Residual action was shown against the large milkweed bug nymphs placed on filter paper at concentrations as low as 0.5%, against the Mexican bean beetle larvae on dipped plant leaves at concentrations as low as 0.1%, and against the southern army worm larvae, *Prodenia eridania*, at 0.1%. This reaction product also showed nematocidal activity at concentrations as low as 0.01%.

The reaction product of p-chlorosulfinylaniline and diethyl phosphite showed contact action against the two-spotted spider mite in the mobile and resting stages on dipped infested bean plant leaves at concentrations as low as 0.1%. Residual action was shown on the large milkweed bug nymph to give 100% kill at 1.0% concentration of the reaction product. This reaction product did not appear to be quite as active as some of the other reaction products.

A fourth reaction product, namely, the reaction product of 2,4-dichlorosulfinylaniline and diethyl phosphite showed the following biological activity: Contact activity was demonstrated against the two-spotted spider mite mobile stages in tests on dipped infested plant leaves at concentrations as low as 0.1%. Contact activity was also shown against the large milkweed bug nymphs at concentrations of 0.125% and against the yellow fever mosquito larvae at concentrations of 1.3 p.p.m. In residual activity tests, activity of the reaction product was shown in testing on the Mexican bean beetle larvae at concentrations of about 0.1%. Additional activity shown was microbiological activity as a fungistatic agent. In this test, the test chemicals were mixed in predetermined concentrations with hot, sterile, Sabouraud's dextrose agar which was subsequently poured into Petri dishes, cooled and allowed to harden. The nutrient agar containing the test compound was then inoculated with the fungus organism, *Aspergillus niger*. The samples were then incubated for 5 days at 25° C. Growth of the fungus was suppressed at a concentration of 0.1% of the reaction product.

It is seen from the above biological testing of these compounds that in general they appear to have biological activity against a rather large number of insects and in the one case some fugistatic activity was demonstrated. Of the compounds tested, perhaps the reaction product showing the best insecticidal activity was the reaction product of t-butylsulfinylamine and diethyl phosphite; however, general insecticidal activity is indicated by the testing of the reaction products, which activity has been described above. These reaction products of organosulfinylamines and dialkylphosphites are generally applied for insecticidal use in the form of sprays or aerosols. Useful sprays can be prepared by dispersing the reaction products in water with the aid of a wetting agent, prepared aqueous dispersions of which may be employed as sprays. In other procedures, the products can be applied to mite and insect hosts as oil-in-water emulsion sprays. The products of the invention can also be dissolved in organic solvents and applied to plants, e.g., from aerosol bombs. Instead of employing liquids as carriers and diluents, insecticidal dusts which contain the inventive compounds as an active ingredient can be prepared, e.g., by incorporating the active material with a solid carrier such as talc, bentonite, fuller's earth, etc. Depending on the particular use for which the insecticide is designed and the particular novel reaction product used, concentration of the novel reaction product in dusts or in liquid form can be in the range of 0.001 to 1.0%. An examination of the biological test data shown above will indicate that such a range may be desirable. For some uses the compounds or some of them may be active at concentrations as low as 1 p.p.m., and for other uses it is possible that concentrations up to about 10% may be desirable; however, normally concentrations of the novel compounds in the range of about 0.01 to about 0.1% are preferred.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention or of the scope of the appended claims.

What is claimed is:

1. A method comprising reacting a sulfinylamine of the formula R—N=S=O with a phosphite of the formula $(R'O)_2POH$ in the presence of a catalyst selected from the class consisting of alkali metals and lower-alkoxy compounds thereof, R being a radical selected from the class consisting of phenyl, halophenyl, naphthyl, and alkyl and alkylated phenyl radicals having not more than 20 carbon atoms, R' being lower alkyl, to produce a new and useful reaction product.

2. The method of claim 1 wherein said catalyst is sodium.

3. The method of claim 2 wherein said sulfinylamine is t-butylsulfinylamine and said phosphite is diethyl phosphite.

4. The method of claim 2 wherein said sulfinylamine is sulfinylaniline and said phosphite is diethyl phosphite.

5. The method of claim 2 wherein said sulfinylamine is 4-chlorosulfinylaniline and said phosphite is dimethyl phosphite.

6. The method of claim 2 wherein said sulfinylamine is t-dodecylsulfinylamine and said phosphite is diethyl phosphite.

7. The method of claim 2 wherein said sulfinylamine is 2,4-dichlorosulfinylaniline and said phosphite is diethyl phosphite.

8. The reaction product of a sulfinyl amine of the formula R—N=S=O wherein R is selected from the class consisting of phenyl, halophenyl, naphthyl, and alkyl and alkylated phenyl radicals having not more than 20 carbon atoms, with a phosphite of the formula $(R'O)_2POH$ wherein R' is a lower alkyl radical.

9. The reaction product of a sulfinyl amine of the formula R—N=S=O, wherein R is an alkyl radical having from 1 to 20 carbon atoms, with a phosphite of the formula $(R'O)_2POH$ wherein R' is a lower alkyl radical.

10. The reaction product of t-butylsulfinylamine with diethyl phosphite.

11. The reaction product of t-dodecylsulfinylamine with diethyl phosphite.

12. The reaction product of a sulfinyl amine of the formula

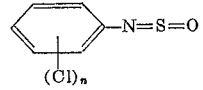

wherein $n$ is an integer from 0 to 5, with a phosphite of the formula $(R'O)_2POH$ wherein R' is a lower alkyl radical.

13. The reaction product of sulfinylaniline with diethyl phosphite.

14. The reaction product of 4-chlorosulfinylaniline with dimethyl phosphite.

15. The reaction product of 2,4-dichlorosulfinylaniline with diethyl phosphite.

16. A parasiticidal toxicant composition comprising an inert carrier and as the essential effective ingredient a parasiticidally effective amount of product of claim 8.

17. A parasiticidal toxicant composition comprising an inert carrier, and as the essential effective ingredient a parasiticidally effective amount of the product of claim 10.

18. The method of killing parasites comprising exposing said parasites to a toxic amount of the product of claim 8.

19. The method of killing parasites comprising exposing said parasites to a toxic amount of the product of claim 10.

No references cited.